US012767109B2

(12) United States Patent
Merza et al.

(10) Patent No.: US 12,767,109 B2
(45) Date of Patent: Oct. 20, 2026

(54) TRAILER VEHICLE AND TRAILER CONTROL SYSTEM

(71) Applicant: KNORR-BREMSE Systeme fuer Nutzfahrzeuge GmbH, Munich (DE)

(72) Inventors: Valer Merza, Munich (DE); Tamas Komlos, Munich (DE); Hugo Koves, Munich (DE); Jan Grebe, Munich (DE); Christian Staahl, Munich (DE)

(73) Assignee: Knorr Bremse Systeme Fuer Nutzfahrzeuge Gmbh, Munich (DE)

( * ) Notice: Subject to any disclaimer, the term of this patent is extended or adjusted under 35 U.S.C. 154(b) by 0 days.

(21) Appl. No.: 18/998,593

(22) PCT Filed: Aug. 25, 2023

(86) PCT No.: PCT/EP2023/073391
§ 371 (c)(1),
(2) Date: Jan. 27, 2025

(87) PCT Pub. No.: WO2024/052140
PCT Pub. Date: Mar. 14, 2024

(65) Prior Publication Data

US 2025/0333037 A1 Oct. 30, 2025

(30) Foreign Application Priority Data

Sep. 5, 2022 (GB) ...................................... 2212941

(51) Int. Cl.
*B60T 13/66* (2006.01)
*B60T 8/17* (2006.01)
(Continued)

(52) U.S. Cl.
CPC .......... *B60T 13/662* (2013.01); *B60T 8/1708* (2013.01); *B60T 8/1881* (2013.01); *B60T 17/22* (2013.01);
(Continued)

(58) Field of Classification Search
CPC ...... B60T 13/662; B60T 8/1708; B60T 17/22; B60T 2270/402; B60T 2270/413; B60T 2270/414; B60T 2270/40; B60T 8/1881
See application file for complete search history.

(56) References Cited

U.S. PATENT DOCUMENTS

2022/0340111 A1* 10/2022 Fry ........................... B60T 7/20

FOREIGN PATENT DOCUMENTS

| | | | |
|---|---|---|---|
| GB | 2 395 241 | A | 5/2004 |
| GB | 2583533 | A | 11/2020 |
| GB | 2583723 | A | 11/2020 |

OTHER PUBLICATIONS

International Search Report (PCT/ISA/210) issued in PCT Application No. PCT/EP2023/073391 dated Oct. 30, 2023 (3 pages).

(Continued)

*Primary Examiner* — Jacob M Amick
(74) *Attorney, Agent, or Firm* — Crowell & Moring LLP

(57) ABSTRACT

A method of controlling brake pressures in a trailer vehicle braking system which has a trailer brake module for controlling a braking force on a wheel or wheels on the trailer. The trailer brake module receives data inputs from sensors on the trailer and a control pressure from a towing vehicle in a control line. The braking system has a second ECU configured to receive sensor inputs from sensors on the trailer to communicate with the trailer brake module and with the towing vehicle. If the second ECU determines that the control pressure should be increased or decreased, the second ECU sends a request to the towing vehicle to increase or decrease the control pressure, respectively.

7 Claims, 4 Drawing Sheets

(51) Int. Cl.
*B60T 8/18* (2006.01)
*B60T 17/22* (2006.01)

(52) U.S. Cl.
CPC ... *B60T 2270/402* (2013.01); *B60T 2270/413* (2013.01); *B60T 2270/414* (2013.01)

(56) References Cited

OTHER PUBLICATIONS

Written Opinion (PCT/ISA/237) issued in PCT Application No. PCT/EP2023/073391 dated Oct. 30, 2023 (6 pages).

* cited by examiner

TRAILER VEHICLE AND TRAILER CONTROL SYSTEM

BACKGROUND AND SUMMARY

The invention relates to a trailer vehicle and a trailer control system, in particular a method of controlling brake pressures in a trailer vehicle.

Electronic braking systems for commercial vehicle trailers and other related applications are becoming increasingly complex as additional functionality is introduced. It is also a highly competitive, cost conscious market. Trailers do not generally possess any autonomous power supply and rely for power on a tractor vehicle. The trailer is provided with an autonomous brake system having an independently operable trailer brake control unit. The trailer electronic brake control unit enables the trailer to be equipped with stability control and greatly enhances the safety of the trailer.

The standard connection between a truck and trailer for braking and running gear is governed by ISO 7638 for 12V and 24V systems. The standard ISO 7638 connector is a 7 pin connector, in which pin 1 provides the power for the trailer brake control valves; pin 2 provides the power for the control electronics, pins 3 and 4 are the respective grounds for these pins; pin 5 is used for fault indication and pins 6 and 7 are used for CAN communication.

A back up electrical connection is optionally provided by the stop lamp supply which is available on the ISO1185 connector. The light control signals for the trailer are provided on the ISO1185 connector and ISO3731 connector. ISO 12098 defines a 15 way connector that is intended to replace the ISO1185 and ISO3731 connectors. The standard ISO12098 connector is a 15 pin connector, in which pin 7 provides the power for the stop lights, which is also used as a backup power supply for the braking system; pin 9 provides an optional power supply, pins 4 is ground for these pins; pins 14 and 15 are used for CAN communication with a separate ground on pin 13. ISO 12098 is not used for braking data or running gear signals, but rather all other signals, including but not limited to obstacle detection.

Additional functionality is most often introduced by including the function as an auxiliary function in the trailer EBS. GB2395241 discloses an electronic control unit ECU having a non-volatile storage memory means for storing braking-related control parameters specific to the vehicle and a programmable storage means to carry operating data for one or more auxiliary functions of the vehicle. Incoming and outgoing variables and control algorithms can then be checked against a predetermined list to safeguard the braking function against error modes.

It is also possible to provide an additional trailer electronic control co-located with the trailer EBS unit to provide an additional intelligence in the trailer braking system outside of the main trailer EBS control unit. This approach simply results in additional costs due to the additional control unit and also increases the installation cost and difficulty due to the additional cabling that is required. This approach has not been commercially successful. Although the additional functionality is not purely concerned with the act of braking but includes for example communication, these are still referred to as being part of the braking system.

As trailers become more sophisticated, the increased cost of the trailer means that the availability of the trailer will be ever more important to the operator. This means that compared to existing vehicles, the level of safety needs to be increased, whilst the availability and performance of critical functions is ensured and the error rate reduced.

Technical problems on a trailer can be broadly categorized in pneumatic problems such as supply or control line failure, reservoir rupture or a pneumatic component failure or alternatively electrical problems such as a failure of the power supply to the trailer or an ECU failure.

With automated driving use case any single fault could force the vehicle combination to: an uncontrolled and immediate stop (potentially causing an accident); a severe speed reduction and/or stop on the highway; a loss of legally required braking functionality (ABS, RSP) and a potentially dangerous condition of the vehicle when emergency brake actuations or braking in non-optimal conditions is required or finally a continuation of driving with unknown vehicle status and unknown vehicle reaction.

The present invention therefore seeks to provide an improved vehicle brake system performance in particular in the event of electrical failures.

According to the invention there is provided a method of controlling brake pressures in a trailer vehicle braking system, which braking system comprises a trailer brake module which controls a braking device capable of generating a braking force on a wheel or wheels on the trailer, which trailer brake module is adapted to receive data inputs from sensors on the trailer and a control pressure from a towing vehicle in a control line, wherein the braking system comprises a second ECU, which second ECU is configured to receive sensor inputs from sensors on the trailer and is configured to communicate with the trailer brake module and to communicate with the towing vehicle, wherein if the second ECU determines that the control pressure should be increased or decreased, the second ECU sends a request to the towing vehicle to increase or decrease the control pressure, respectively.

Preferred aspects of the invention can be found in the dependent claims.

The invention therefore addresses the problem of providing a suitable brake system performance in the event of an electrical failure. In general with an electrical failure the mechanical and pneumatic functionality of the brake system remains intact.

The principle underlying the invention the use an ECU, in addition to the trailer brake module together with various valve(s) to control the control pressure (p4) of the brake system and thereby utilizing the relay functionality of it thereby enabling smaller and cheaper valves. With this it is possible to provide electronically controlled braking, load dependent braking and stability functions in the event of an electrical fault.

Advantageously, in the event of a failure, the main ECU can modulate either the input pressure (p4) of the trailer brake control module or the output pressures (p21/p22). It does this either directly with valves located in towed vehicle or indirectly via the brake control system in the towing vehicle.

With the invention, the electrical faults outlined above can be handled as the vehicle still has full gradable brake and stability functionality.

Exemplary embodiments of the invention will now be described in greater detail with reference to the drawings.

DETAILED DESCRIPTION OF THE DRAWINGS

Figure 1:
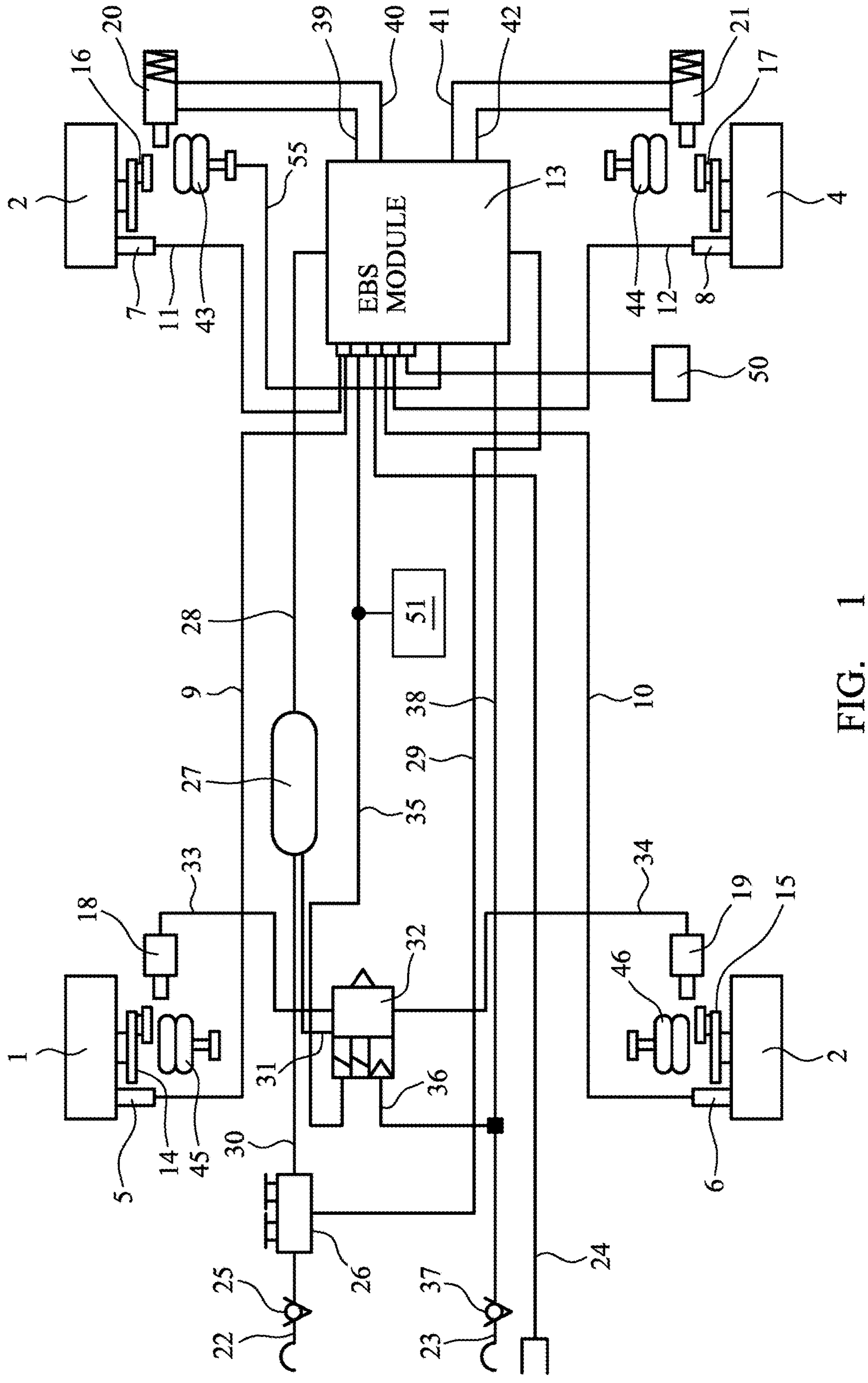
FIG. 1 shows a trailer electronic braking system.

FIG. 1 shows a known trailer electronic braking system in which the utility vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake pressure control module 13 (trailer brake module or EBS module) which is primarily assigned to the rear axle brakes. One brake 14-17 is in each case assigned to the front wheels 1, 2 and the rear wheels 3, 4, which brake 14-17 can be applied by means of brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer. The electric control line 24 provides the ISO 11992 CAN data connection.

The supply line connection 22 is connected by way of a return valve 25 and a parking valve 26 with an air brake reservoir 27. From the air brake reservoir 27, a pneumatic line 28, 30 leads to a supply input of the pressure control module 13 and ABS valve 32. In addition, a pneumatic line 29 branches off the parking valve 26 to the pressure control module 13. A pneumatic line 30 extends between the parking valve 26 and the air brake reservoir 27.

The ABS valve 32 is assigned jointly to both brake cylinders 18, 19 of the front axle and is connected with the brake cylinder 18 by way of a pneumatic line 33 and with the brake cylinder 19 by way of a pneumatic line 34. The ABS valve 32 has two electric control inputs which are connected by way of "one" electric line 35 shown here only schematically with the pressure control module 13.

Furthermore, the ABS valve 32 has a pneumatic control input 36 which is connected by way of a return valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the ABS valve, which control pressure is identical to the maximal pressure which can be controlled into the brake cylinders 18, 19.

The pressure control module 13 has pneumatic outputs 39-42 which are connected by way of assigned pneumatic lines with the spring brake cylinders 20 or 21.

Furthermore, pneumatic axle load sensors or air bellows 43, 44 are provided at the rear axle and permit a determination of the axle load, particularly of the dynamic axle load during braking and starting. The axle load sensors or air bellows 43, 44 are connected by way of pneumatic lines with the pressure control module 13. Correspondingly the pressure in airbags 45, 46 provided at the front axle, which here are electrically controlled, may be detected by the transducer 47. However, the axle load sensors 45, 46 are not absolutely necessary.

To provide stability control, a lateral acceleration sensor 50 is provided, which may also be integrated with a yaw sensor, and the output of the lateral acceleration sensor is fed to the pressure control module/ECU 13. Typically the lateral acceleration sensor 50 is integrated into the pressure control module/ECU 13. In the event that lateral acceleration on the trailer is detected, the pressure control module can provide for increased brake force at the front and/or rear axles. When the lateral acceleration sensor 50 detects lateral acceleration on the trailer in which it is installed, the sensor generates a signal setting the stability control to active.

With respect to the embodiment described to FIG. 1, the ABS valve 32 may be replaced with an electro-pneumatic valve where the electric control line 35 consists of a commutation means preferably CAN and an electric power source.

The pressure control module 13 receives data from the wheel speed sensors on the trailer and also receives a signal indicating whether the brake pedal in the vehicle cab is depressed or not, as well as the brake pressure demand. In addition to the ISO 7638 electrical connection shown, trailers can also have an ISO 1185 electrical connection for supplying power to indicator lights and the trailer stop lights.

In a further embodiment of the braking system, the system is provided with the ISO 7638 and, optionally, ISO 1185 (or alternatively ISO12098) connections being connected to an electronic control module. The electronic control module can be located at the trailer headboard and receives the brake and running gear control signals from the Truck-Trailer CAN bus. The trailer electronic module is further connected to a first trailer brake CAN bus, to which the trailer brake module (equivalent to EBS module 13) is connected. The trailer brake module is further connected to wheel speed sensors and Auxiliary I/O.

The electronic control module is further connected to a second trailer brake CAN bus, to which the Trailer Electronic Pressure Module is connected (equivalent to single channel brake module 32). The Trailer Electronic Pressure Module 306 receives inputs from the wheel sensors and Auxiliary I/O inputs.

Figure 2:
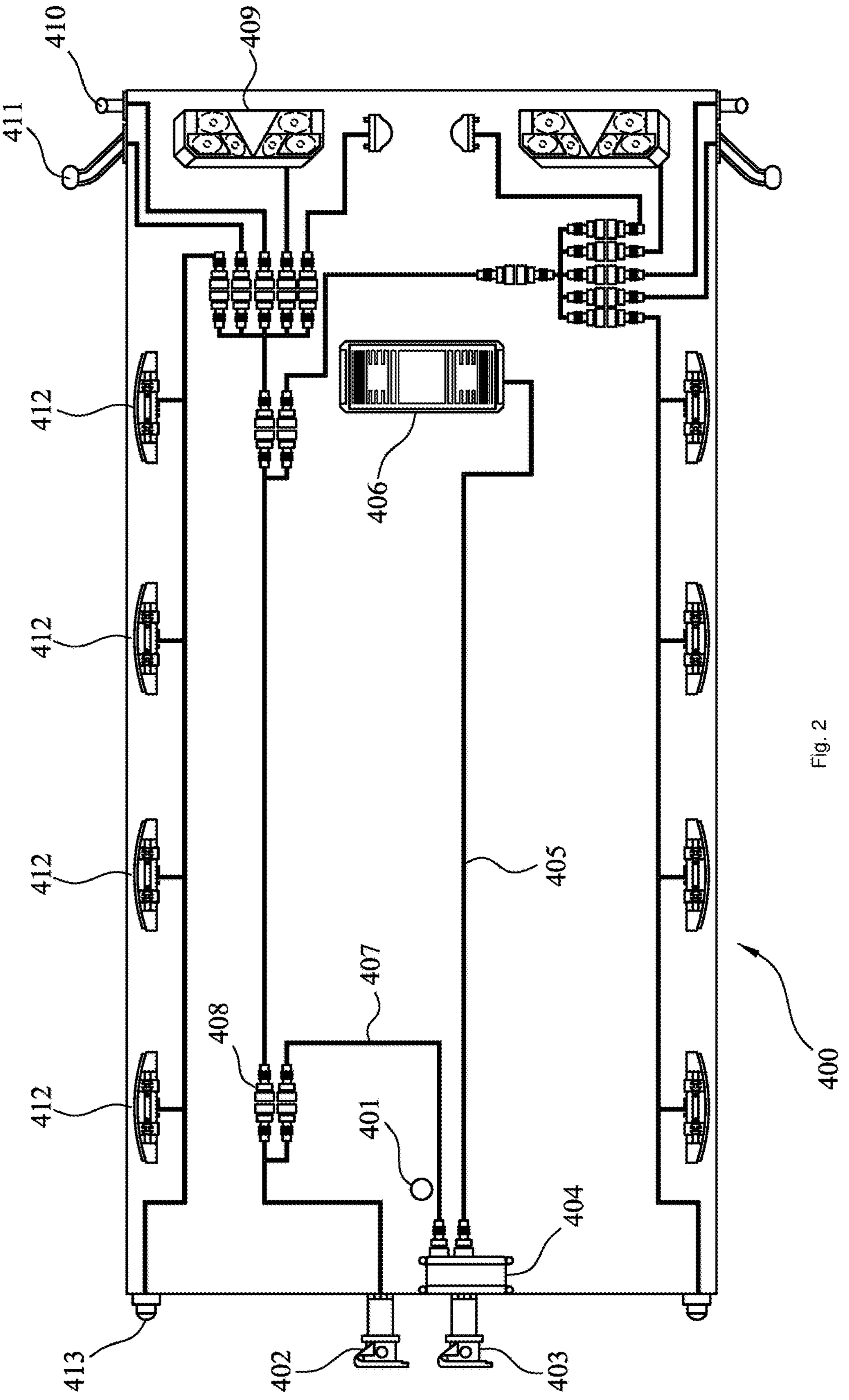
FIG. 2 shows schematically the electrical connection in an embodiment of the invention.

FIG. 2 shows an alternative embodiment of a braking system in a trailer 400. The front end of the trailer, denoted by kingpin 401, is provided with a separate ISO 12098 connector 402 and ISO 7638 connector 403. The ISO 7638 connector 403 is provided with an electronic control unit 404. The electronic control unit 404 is connected by way of an electrical and CAN bus connection 405 to the trailer EBS 406 and by way of electrical connection 407 to a splitter 408, which is also connected to the ISO12098 connector 402 and which provides the connection to the trailer lighting system. The trailer lighting system, which is symmetrically arranged on the trailer, comprises rear light clusters 409, which clusters include the brake, reversing and night lights, top 410 and bottom 411 rear marker lights, four side marker lights 412 and a front marker light 413.

Figure 3:
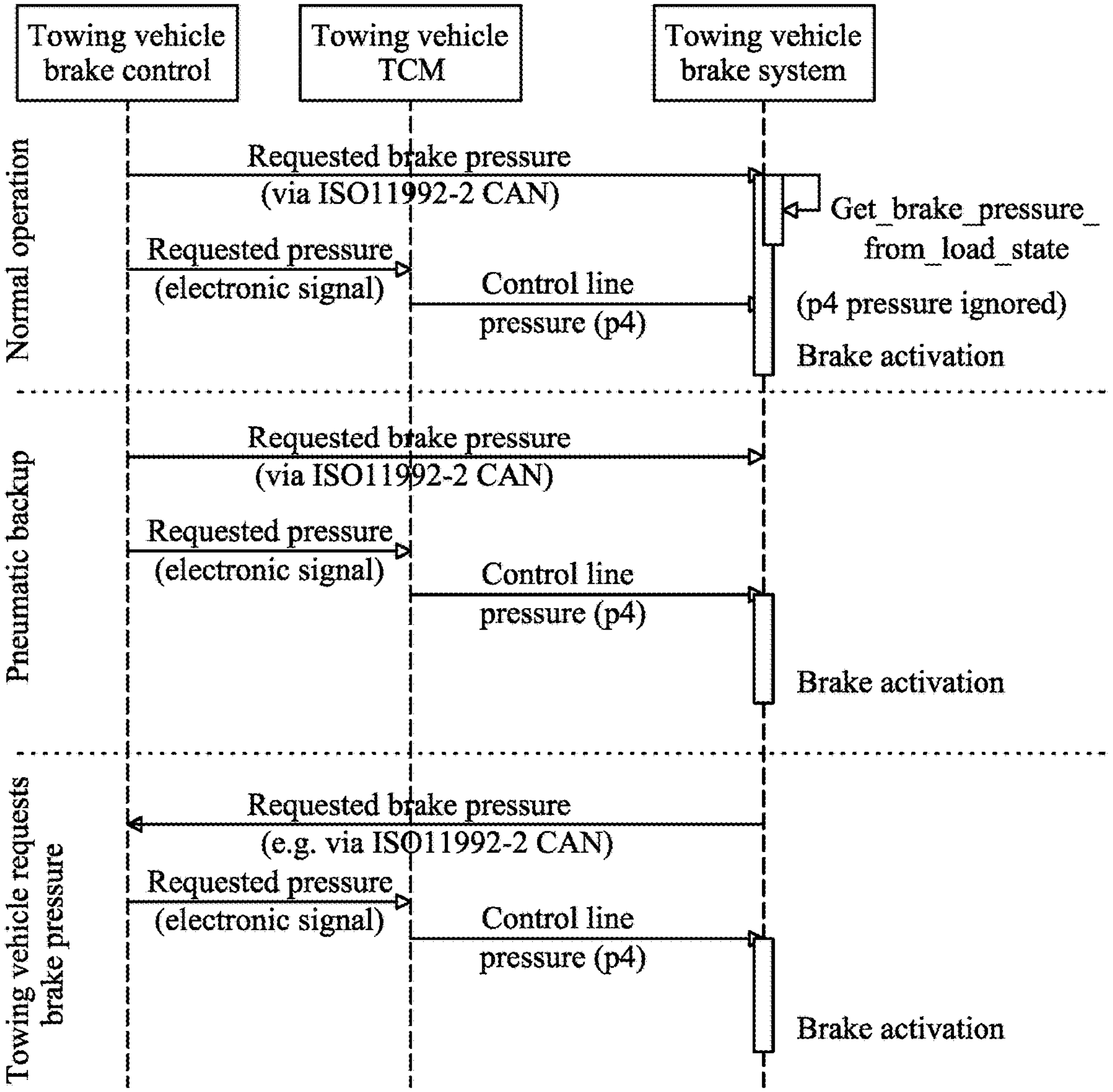
FIG. 3 is a sequence diagram outlines a simplified brake activation sequence in accordance with the invention.

FIG. 3 shows a sequence diagram outlining a simplified brake activation sequence for three cases.

The first case corresponds to normal operation, where the towed, trailer vehicle receives an electrical signal describing the requested brake pressure from the towing vehicle. Using the load state, the towed vehicle corrects the requested brake pressure up or down so as to minimize coupling force and improve combination stability. The towed vehicle brake control system then executes the brake pressure. In parallel the towing vehicle sends a pneumatic control signal representing the brake force. If the electric brake signal is received and executed, the towed vehicle brake systems ignores this pneumatic signal.

The second case corresponds to a pneumatic backup: In this case the electric communication line between towed and towing vehicle is interrupted. The towed vehicle executes the brake activation based on the pneumatic input signal.

Figure 4:
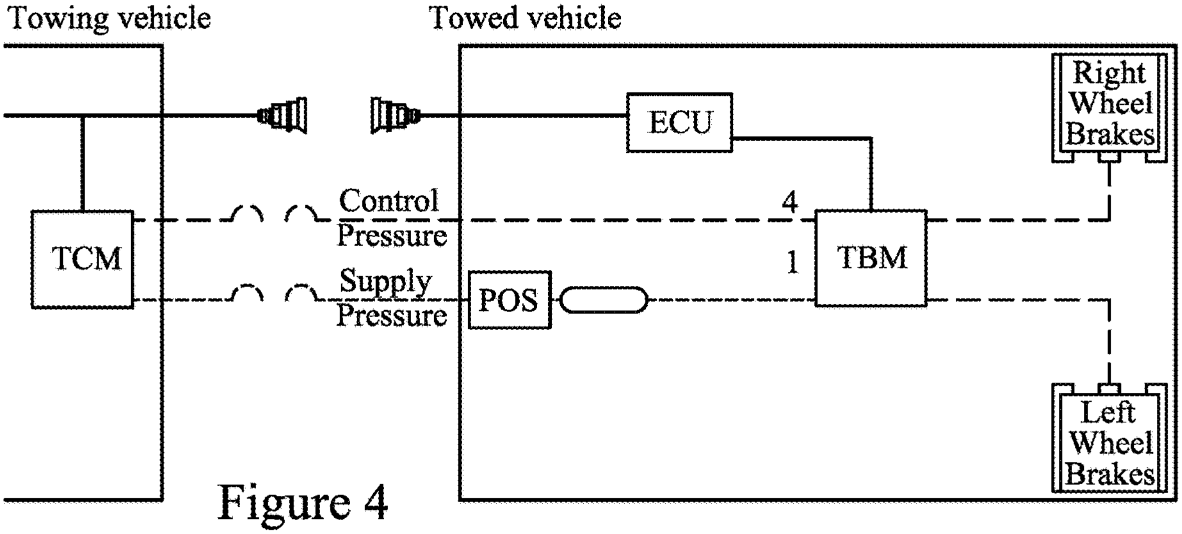
FIG. 4 shows an arrangement of a first embodiment of the brake system of the invention.

FIG. 4 shows schematically the connections in the third case, in accordance with the invention, in which the towed vehicle requests the brake pressure via the ISO 11992 CAN bus connection or equivalent. In this case the towed vehicle requests a control pressure that can be either higher or lower than the control pressure that the towing vehicle is currently supplying. The towing vehicle then executes this request via the tractor brake control and supplies the amended control pressure. The pressure applied on the towed vehicle is modulated by the towing vehicle. From this point the control algorithm follows the second case.

There can also be an intermediate step between cases 1 and 2 where the towed vehicle brake system has power supply (e.g. via brake light) but no communication. In this case the pneumatic control signal can be corrected dependent on load state before it is executed as brake activation.

In its simplest form the invention can be implemented with a brake system such as that shown in FIG. 1. In this case however only some faults (e.g. one or more of the pressure control valves are faulty) can be covered as the communication functionality of the trailer brake system and thereby also its power supply is necessary for other faults.

Preferably, a second ECU is provided in the towed vehicle/trailer, which second ECU can communicate with the towing vehicle. Ideally it should have second communication channel and have a second power supply as this maximizes the number of faults that can be addressed.

The setup illustrated in FIG. 4 is an embodiment that does not focus on addressing a maximum number of potential faults but is a compromise. All faults internal to the trailer brake control module can be addressed by this setup, whereas errors pertaining to the towing vehicle or the interface (e.g. electrical supply fault in the towing vehicle or faulty connector) are not addressed.

Figure 5:
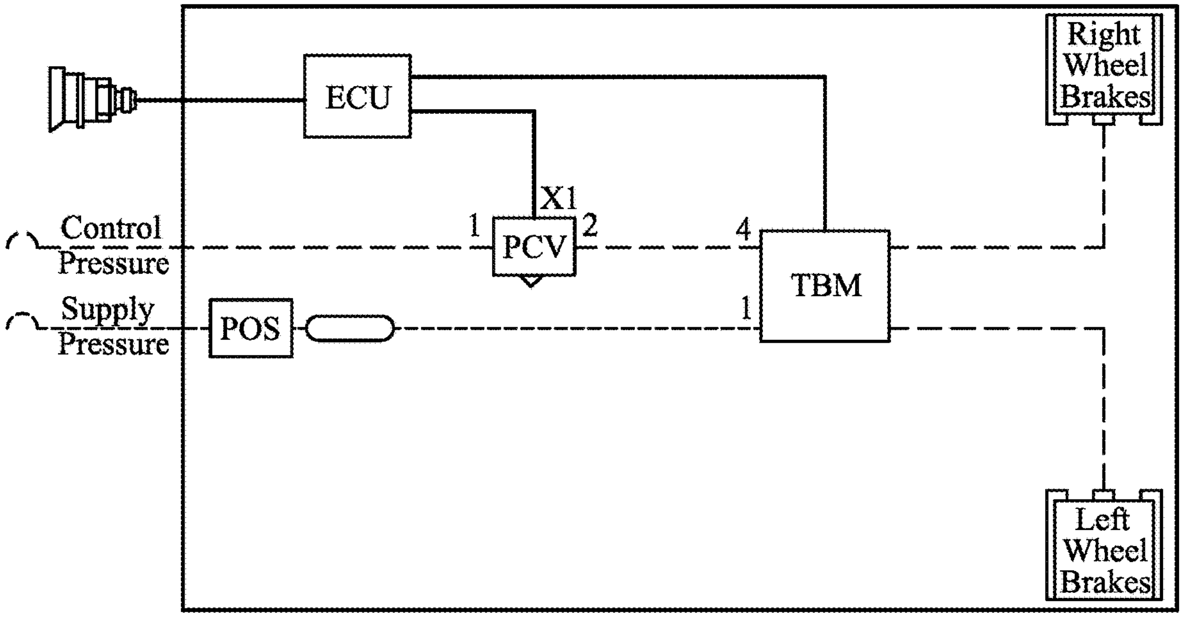
FIG. 5 shows a further embodiment of FIG. 4.

FIG. 5 shows a further embodiment of the brake system, in which the control pressure p4 can be increased via a request from the trailer brake control module to the towing vehicle and is decreased by means of a pressure control valve (PCV). The PCV is a combination of two 2/2 valves with which the control pressure can be modulated between ambient pressure and the input pressure. In the system of FIG. 5 a pressure control valve is placed in the control line between the towing vehicle and the trailer/towed vehicle, which PCV can be electrically actuated via an electrical connection to the second ECU, which is also as with the embodiment of FIG. 4 connected to the trailer brake module. The addition of a PCV enables the towed vehicle to reduce the pressure, e.g. for ABS control, without involving the towing vehicle. In this way a pressure reduction can be realized more quickly, which enhances ABS performance, for example. The second ECU in use will typically request a constant high pressure from the towing vehicle and the PCV reduces the input pressure to the trailer brake module, which is in a passive mode.

Figure 6:
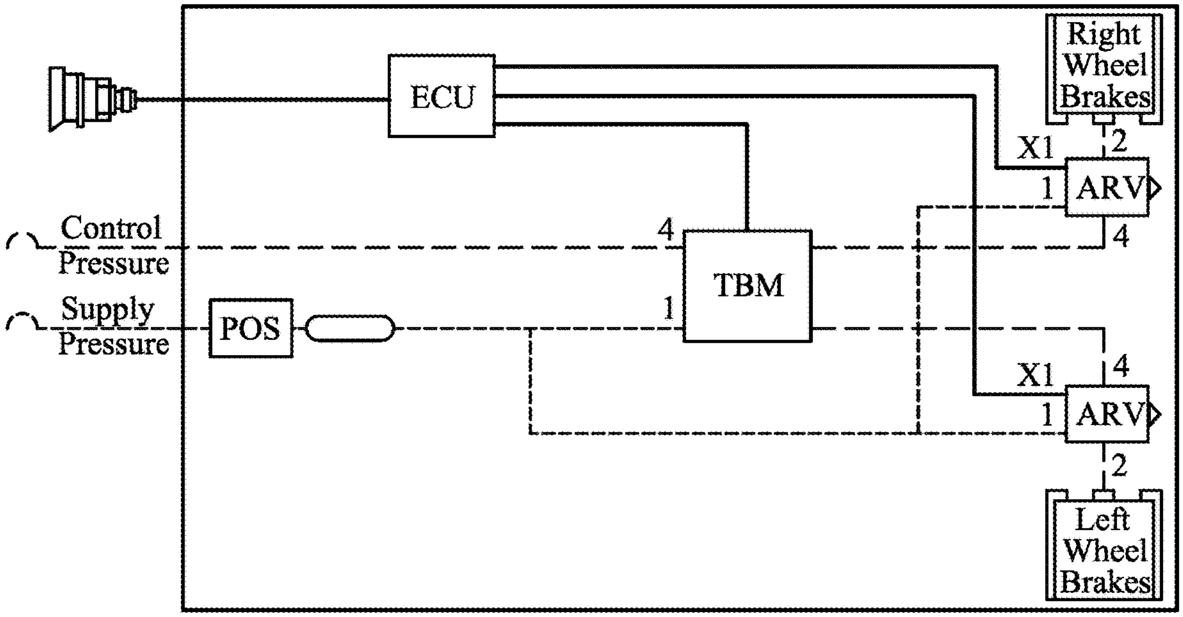
FIG. 6 shows a further embodiment with relay valves.

FIG. 6 shows a further alternative embodiment in which pressure is requested from the towing vehicle. In this embodiment the brake system is provided with two relay valves, which are shown here as ABS relay valves. The control pressure p4 can be increased by means of a request to the towing vehicle and the brake supply pressures p21/p22—can be decreased with the Relay Valves. Each Relay Valve is similar in functionality to the PCV in that it can decrease and hold pressure. Each valve is pneumatically connected to the main supply and received a pneumatic control signal from the trailer brake control module. The valves are electrically controlled by the second ECU. The output of the relay valve supplies a brake pressure into the wheel. In addition to a pressure control valve it integrates a relay portion so that larger air masses can be modulated. This allows the towed vehicle to control pressure on more than one channel (e.g. left/right side) independent of each other. As the control is now placed on the output of the trailer brake control module, greater air masses need to be controlled which means a relay part is used instead of simply a pressure control valve.

In the embodiments of FIG. 6, it would be possible to use a simple valve in place of a relay valve for a single axle trailer. It would further be possible to combine the valves on the output side of the trailer brake module shown into a single mechatronic module, which could feature integrated pressure control. Based on electronic control signals it can precisely control its output pressure and process wheel speed sensor signals. The single channel electropneumatic module has a pneumatic connection to the main supply pressure line and can control the pressure in the control line to the trailer brake control module. The module is electrically controlled by the second ECU.

At this time, the standards in force are ISO 1185:2003 ISO 7638-1/2:2018, ISO 11992:2021 and ISO12098: 2020 and SAE 560:2020.

The invention claimed is:

1. A method of controlling brake pressures in a trailer vehicle braking system, which braking system comprises a trailer brake module for controlling a braking force on a wheel or wheels on the trailer, which trailer brake module is adapted to receive data inputs from sensors on the trailer and a control pressure from a towing vehicle in a control line, and wherein the braking system comprises a second ECU, which second ECU is configured to receive sensor inputs from sensors on the trailer and is configured to communicate with the trailer brake module and to communicate with the towing vehicle, the method comprising:
   - determining, by the second ECU, whether the control pressure should be increased or decreased; and
   - sending, by the second ECU, a request to the towing vehicle to increase or decrease the control pressure, respectively, to modulate the pressure applied on the trailer.

2. The method of controlling brake pressures according to claim 1, wherein
   - the second ECU is provided with a communication channel to the towing vehicle, said communication channel being independent of communication channels from the trailer brake module to the towing vehicle.

3. The method of controlling brake pressures according to claim 2, wherein
   - the second ECU is provided with an electrical power supply, said electrical power supply being independent of a power supply for the trailer brake module.

4. The method of controlling brake pressures according to claim 1, wherein
   - the control line is provided with a pressure control valve controllable by the second ECU, said pressure control valve being adapted to reduce the control pressure towards the trailer brake module.

5. The method of controlling brake pressures according to claim 1, wherein the brake system is provided with first and second valves, each of said first and second valves being associated with a braking channel to a respective wheel of the trailer, wherein each valve is pneumatically controlled by the trailer brake module and electrically controlled by the second ECU and is adapted to decrease the pressure supplied to the wheel.

6. The method of controlling brake pressures according to claim 5, wherein the first and second valves are relay valves.

7. A method of controlling brake pressures according to claim 6, wherein a pressure transducer is provided to measure the pressure output of the relay valve to the wheels to provide an electrical signal to the second ECU.

* * * * *